G. G. RHINEVAULT.
GRINDING MACHINE.
APPLICATION FILED DEC. 29, 1916.
1,236,604.
Patented Aug. 14, 1917.
2 SHEETS—SHEET 1.
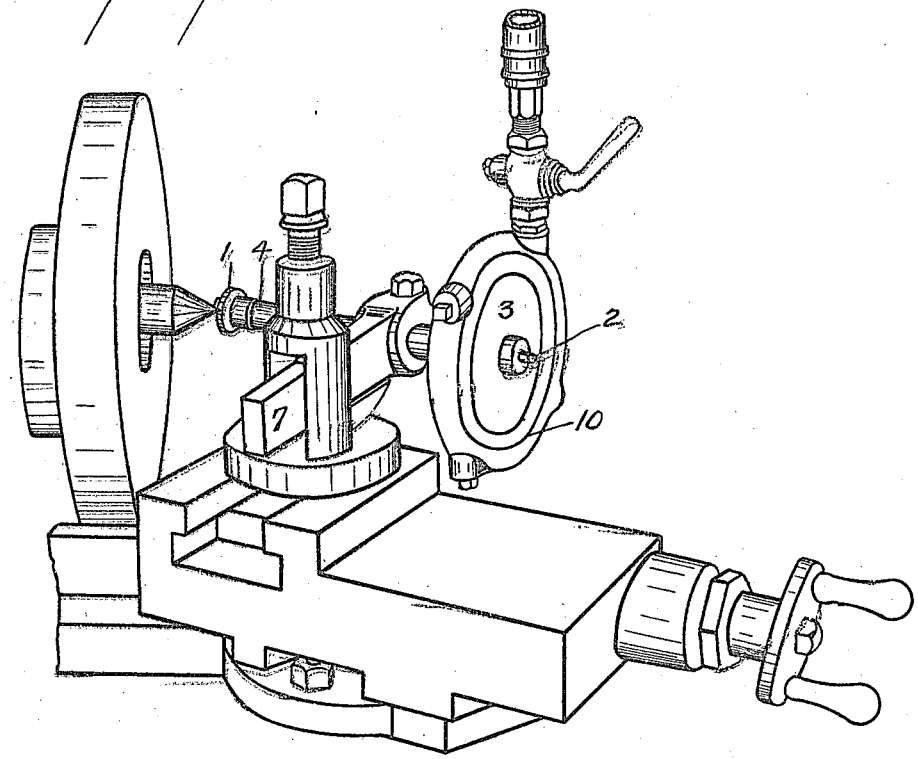
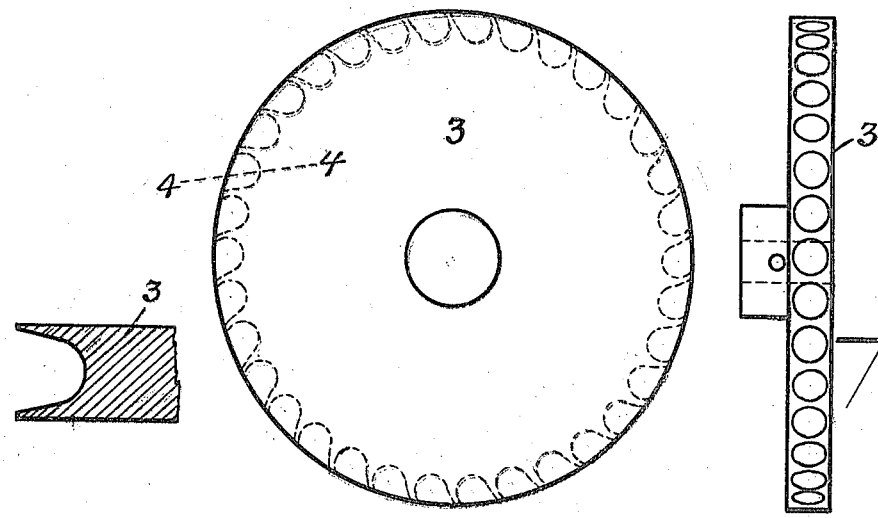
INVENTOR
Glenn G. Rhinevault
BY
Geo. B. Willey ATTORNEY G. G. RHINEVAULT.
GRINDING MACHINE.
APPLICATION FILED DEC. 29, 1916.
1,236,604.
Patented Aug. 14, 1917.
2 SHEETS—SHEET 2.
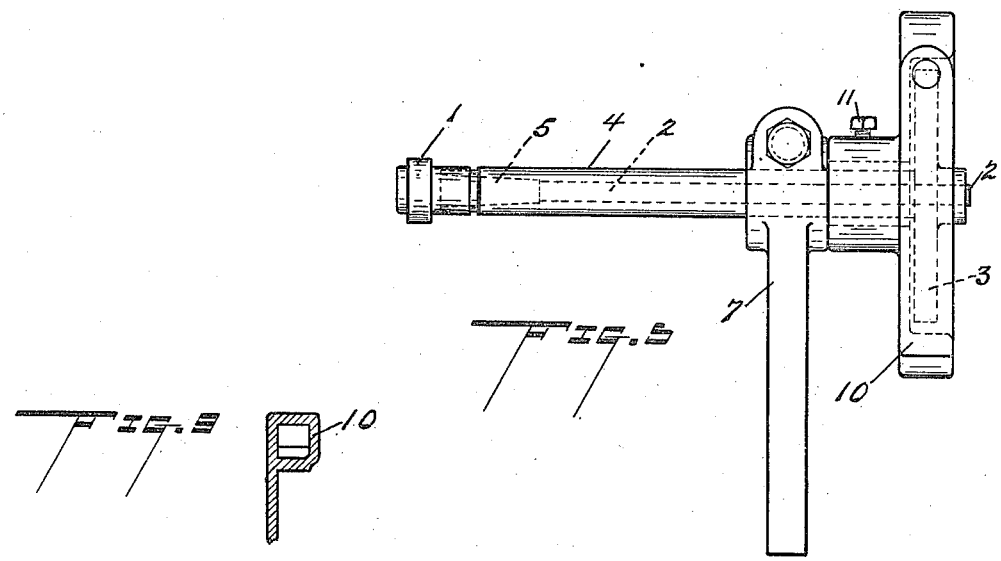
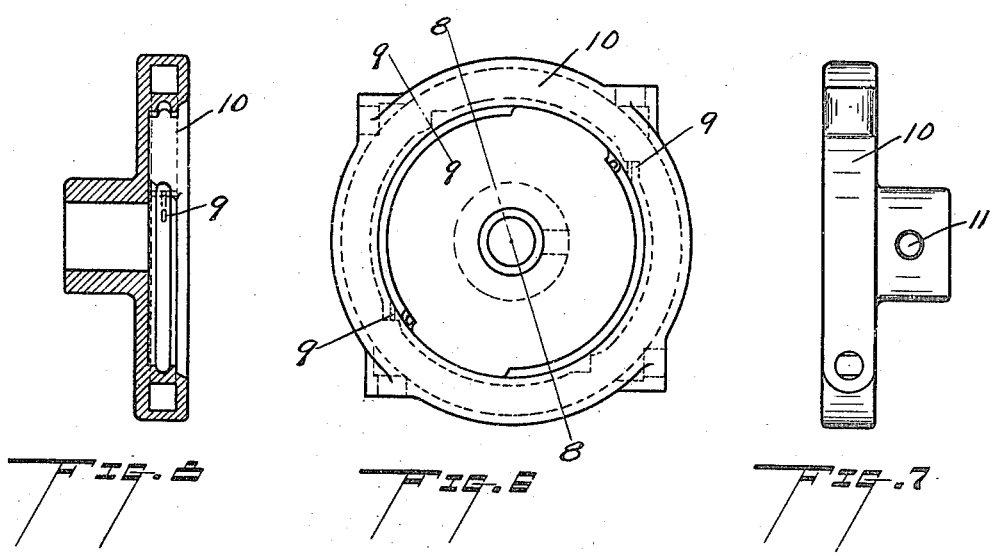
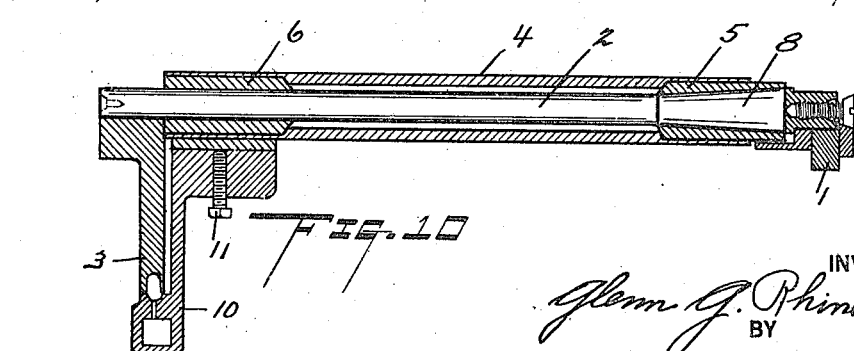
INVENTOR
Glenn G. Rhinevault
BY
Geo. B. Willcox ATTORNEY

UNITED STATES PATENT OFFICE.

GLENN G. RHINEVAULT, OF SAGINAW, MICHIGAN, ASSIGNOR OF ONE-HALF TO W. B. MERSHON & CO., OF SAGINAW, MICHIGAN, A CORPORATION OF MICHIGAN.

GRINDING-MACHINE.

1,236,604.    Specification of Letters Patent.    Patented Aug. 14, 1917.

Application filed December 29, 1916. Serial No. 139,481.

*To all whom it may concern:*

Be it known that I, GLENN G. RHINEVAULT, a citizen of the United States, residing at Saginaw, in the county of Saginaw and State of Michigan, have invented certain new and useful Improvements in Grinding-Machines; and I do hereby declare the following to be a full, clear, and exact description of the invention, such as will enable others skilled in the art to which it appertains to make and use the same.

This invention relates to grinding machines, and pertains more particularly to machines of the class commonly known as tool post grinders, comprising a grinding wheel of small diameter, mounted with a motor on a portable bracket, the entire machine being capable of being clamped to the tool post of a lathe, or in a vise.

My present improvements relate to a simplified construction and arrangement of parts whereby the objects of my invention are attained. These objects are, first, to provide a motor which can be mounted on the wheel shaft, and capable of driving the wheel at high speed, say, thirty thousand revolutions per minute; second, to provide a bearing arrangement that will enable the wheel to be located a considerable distance from the motor, on the end of a long spindle, so the wheel can be used for deep interior grinding, without chattering or vibration of the wheel and spindle.

My invention further includes an adjustable bearing for the wheel, whereby the wheel is kept perfectly centered while running at high speeds, and the pressure of the spindle against its bearing is kept at a predetermined amount, to suit the materials of which the bearings are made, and the nature of the lubricant used, and this uniform pressure is maintained regardless of any elongation of the spindle caused by warming in the work.

With the foregoing and certain other objects in view, which will appear later in the specification, my invention consists in the devices herein described and claimed, and the equivalents thereof.

In the drawings, Figure 1 is a perspective view of my improved grinder applied to the tool post of a lathe, in position for grinding the lathe center.

Fig. 2 is a side view of the air-rotor.

Fig. 3 is an edge view of the same.

Fig. 4 is an enlarged cross-section through one of the vanes, on line 4—4 of Fig. 2.

Fig. 5 is a top plan view of the grinder mounted for use on a lathe tool-post or in a vise.

Fig. 6 is an end view of the casing which incloses the air rotor.

Fig. 7 is a side view of the same.

Fig. 8 is a transverse section on line 8—8 of Fig. 6.

Fig. 9 is an enlarged fragmentary section on line 9—9 of Fig. 6.

Fig. 10 is a part longitudinal section through the sleeve that carries the revoluble spindle, showing the relative locations of the bearings, grinding wheel, air-rotor and adjustable rotor housing.

As is clearly shown in the drawings, the device consists in the usual grinding wheel 1, preferably of small diameter so as to be adapted to be inserted in work of small internal diameter, for internal grinding.

The grinding wheel is mounted on one end of a revoluble spindle 2, and at the other end of the spindle is a rotor 3 capable of rotating the wheel at, say, thirty thousand revolutions per minute. I have illustrated the rotor as adapted to be driven by compressed air, which method of driving I have found in practice to be entirely satisfactory, for the desired speed is easily attained, and simplicity of construction and proper rotating balance are maintained in that type of motor. An electric motor could be used instead of the air motor, if desired, but at the present time electric motors of small size, capable of driving the small grinding wheel by direct connection at, say, thirty thousand revolutions per minute, are not available, and they are not as simple in construction or as durable as the air motor which I have chosen to illustrate my improvements.

The spindle 2 is inclosed in a non-revoluble tubular sleeve 4, provided at its outer, or grinding-wheel end with an internally tapered bearing 5, lined with anti-friction metal. The inner or rotor end of sleeve 4 is provided with a cylindrical bearing 6. To support the sleeve 4 a suitable bracket-arm 7 is clamped to the sleeve. The bracket may be mounted in the tool post of a lathe, as shown in Fig. 1, or otherwise held.

Referring to the revoluble spindle 2, Fig. 10, it will be noted that the end which carries the rotor is capable of endwise movement in the cylindrical bearing 6, and the end which carries the grinding wheel is formed with a tapered journal 8, accurately fitted to the tapered bearing 5, so that the amount of play between the journal and its bearing can be very accurately controlled by controlling the endwise movement of the spindle 2.

It is important that the spindle shall run perfectly true in its bearings and that neither wear of the bearing surfaces nor expansion and contraction caused by temperature changes shall affect the looseness or tightness of the outer bearing.

I accomplish this desired result automatically by utilizing the rotor as a means of maintaining a predetermined degree of tightness in the tapered bearing regardless of wear or temperature changes.

I avail myself of a peculiarity of operation possessed by the rotors of electric motors, compressed air motors, etc., viz., that such rotors when under high speed, tend to move in a direction lengthwise the shaft until they assume a position of running balance, or a neutral position, with reference to the field or to the air jets, as the case may be.

For illustration, the air rotor 3 is driven by air jets issuing from small nozzle openings 9, 9 located on opposite sides of the annular housing 10. When under speed, the rotor tends to move lengthwise the sleeve 4, until its plane is in a neutral position with respect to the plane of the jets 9. Spindle 2 is thereby moved lengthwise, increasing or decreasing the tightness of the tapered journal 8 within its tapered bearing 5.

Shifting the position of the housing 10 along the tubular sleeve 4, by means of the set screw 11, will correspondingly shift the neutral position of the rotor with respect to the sleeve; and when the housing is so placed on the sleeve that the rotor will slightly tighten the tapered bearing by its effort to reach the neutral plane, there is exerted a slight, yielding, longitudinal pull on the spindle 2 that effectively preserves the closeness of the bearing, prevents chattering at high speed, and automatically eliminates any play that otherwise might be created by expansion of the shaft when it becomes warm, and automatically takes up wear of the tapered bearing.

By this means I am enabled to retain the exact thickness of lubricant film required for smoothest running of the grinding wheel.

By the arrangement above described, the bearing that guides the wheel, and upon which depends the accuracy of grinding, is located close to the grinding wheel, but both the bearing and the wheel may be mounted on a long sleeve 4 and thus located a considerable distance from the supporting bracket arm 7, so that the interior of a long piece of work may be accurately grooved.

The high speed of the rotor 3 enables a very small wheel to be employed; consequently a bore of small diameter may be ground.

By mounting both the wheel 1 and the rotor 3 on spindle 2 all side strain on the spindle and bearings is avoided.

A further advantage of the above described construction is that all the parts are readily accessible and the entire machine can be quickly taken apart for cleaning and reassembled.

Having thus described my invention, what I claim and desire to secure by Letters Patent is:

1. A grinding machine comprising a tubular sleeve formed with an internal cylindrical bearing near one end and an internal tapered bearing near the other end; a revoluble spindle within said sleeve, said spindle formed with a tapered journal, a grinding wheel mounted on one end of said spindle, a rotor fixed to said spindle near the opposite end thereof, a housing carried by said sleeve and longitudinally adjustable thereon, the housing inclosing said rotor but out of contact therewith, means carried by said housing for directing impelling force upon the periphery of said rotor to actuate it, and means adapted to secure said housing in various adjusted positions relative to said rotor, whereby the longitudinal pull of the rotor is caused to automatically effect a predetermined adjustment of the pressure on said tapered bearing.

2. In combination, a tubular sleeve formed with a cylindrical bearing near one end and a tapered bearing near the other end thereof, a spindle within said tube and rotatable in said bearings, said spindle having a grinding wheel on one end and an air-propelled rotor on the opposite end, a housing carrying air jet nozzles inclosing said rotor but out of contact therewith, and means for adjusting said housing lengthwise said sleeve, whereby to automatically adjust the pressure of said spindle against said tapered bearing, for the purposes set forth.

In testimony whereof, I affix my signature in presence of two witnesses.

GLENN G. RHINEVAULT.

Witnesses:
 NELLIE M. ANGUS,
 ROY WALLIS.

Copies of this patent may be obtained for five cents each, by addressing the "Commissioner of Patents, Washington, D. C."